Patented June 18, 1935

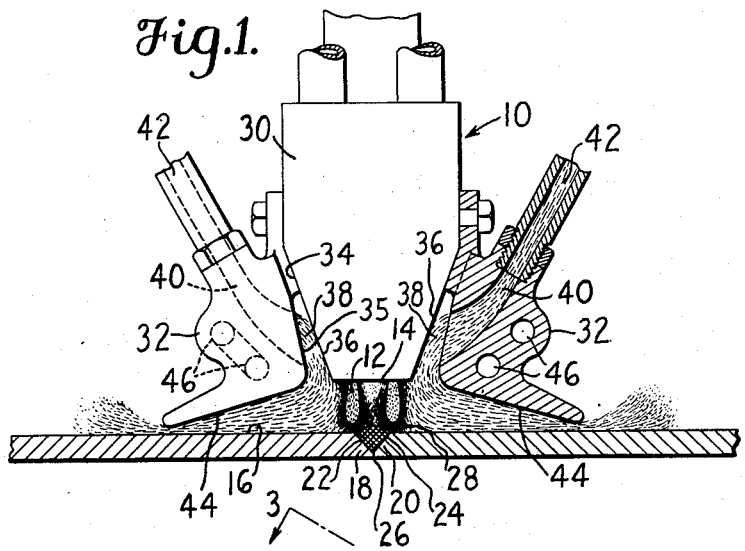
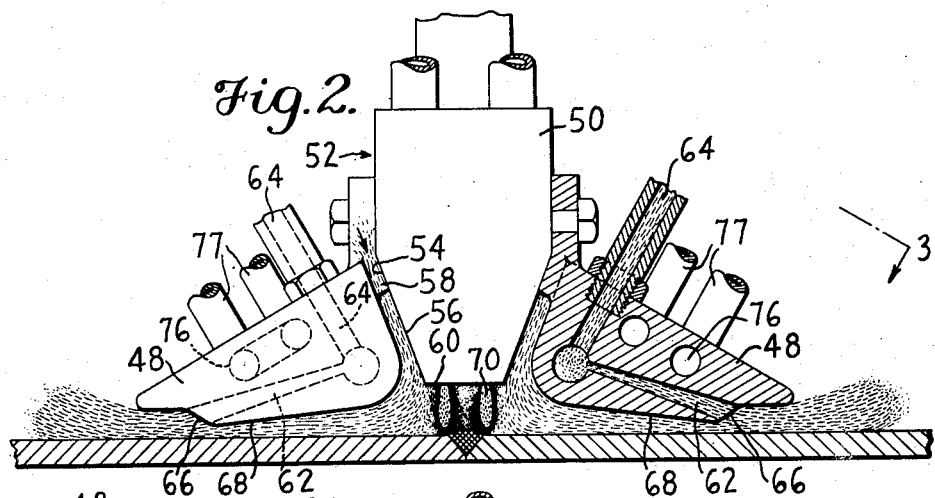

2,005,308

UNITED STATES PATENT OFFICE 2,005,308

WELDING BURNER

James L. Anderson, Tenafly, N. J., assignor to Air Reduction Company, Incorporated, New York, N. Y., a corporation of New York Application April 1, 1931, Serial No. 527,031

17 Claims. (Cl. 158—27.4)

This invention relates to an oxy-fuel gas burner for welding.

During the combustion of fuel gases, such as acetylene, which are used in the so-called "gas welding" devices, a number of stages are passed through before the gases are dissipated in completely burned condition. In the case of acetylene, at least two stages of combustion have been noted, namely, a primary stage in which the oxygen attacks the acetylene to break it down to carbon monoxide and hydrogen, and a secondary stage, in which either by pure oxygen from the burner or diluted oxygen from the air the hydrogen and carbon monoxide are converted into water vapor and carbon dioxide.

The temperature in the first stage is close to the highest temperature now obtainable by man and the point at which this stage of the reaction is completed in the flame jet has long been recognized as an efficient means for quickly and effectively fusing metal. This point is quite concentrated in its location; however, the gases resulting from the reaction at this point are of considerable volume, the actual reaction increasing by fifty per cent. the volume of the gas, while expansion, due to change of pressure from that at which the gases are delivered and due to the temperature of the flame jets, accounts for an increase in volume of approximately one hundred per cent.

These great volumes of gas, which are combustible, tend to rise and move rapidly away from the scene of the melting metal and in normal operation their heat content and the heat derivable from their combustion are very largely lost in so far as assistance in bringing the metal at the weld region to fusing temperature is concerned. One of the great problems in welding by oxy-fuel gas devices, and especially where such devices are made part of a "mechanical" welding system, involves the utilization in some manner of the heat which can be realized from the combustion of these gases, generally known as the hydrogen envelope gases. It is, of course, desirable that the heat derivable from these gases be taken advantage of in the immediate operation, that is, that the heat content of the gases while still hot from the combustion of the acetylene to carbon monoxide and hydrogen, may be applied as much as possible to heating the metal to be welded to a degree much higher than its normally cold condition, and as near as possible to the temperature of fusion, so that the oxy-fuel gas jets themselves which, under such circumstances, would by their direct action be required to impart to the metal but a portion of the total heat necessary for melting the metal, would become more effective and speedier in the operation of fusing the metal, with a resultant decrease in the number or size of jets necessary for a given operation, or an increase in the speed of welding for a given number and size of jets.

Then, also, where the burner tip must be positioned between a set of clamps which are used to retain in position the metal to be welded, it has been found that, due to the constriction of the space between burner face, the clamp face and the jets, an insufficiency of atmospheric oxygen necessary for completion of the second stage of the combustion reaches the jets, and results in some cases in extinguishing some of the jets by their envelope gases.

It is an object of this invention to provide oxy-fuel gas welding apparatus in which atmospheric oxygen or similar oxidizing gases may be directed toward the jets issuing from such apparatus in such manner that their combustion will be unhampered and uninterrupted, and so that complete combustion of the gases through all the stages thereof will be effected near the surface of the work. By such means there is effected the heating of the solid metal, in proximity to the portions to be welded, to a much higher temperature than ordinarily arises during combustion of such gases, with consequent lessening of the conduction losses from the welded portions. Combustion close to the source of the jets and along the surface of the work also results in reduction of distress to the welder from the ordinarily long backward flowing envelope flames, and reduction in the effects upon the apparatus of the gases which would ordinarily burn up around the body of the tip or torch, with consequent increase in general efficiency.

For this purpose, in one embodiment of the invention, torches, which may be otherwise of ordinary construction, are provided with means whereby air may be inspirated or may be driven positively past the jets. The means may consist of parts associated with the torch body and formed so that the burning envelope gases will be constrained in their flow to bring them into direct and effective heating relation with the surface of the metal against which the jets are directed. Such constrained flow of these gases, which are in effect reducing gases, results in maintaining immediately over the highly heated metal a reducing atmosphere which will continuously be effective to prevent oxidation of such highly heated metal. Combustion of the envelope gases at and over the surface insures very effective heat interchange between gas and metal.

During welding, slag or oxide particles are usually discharged upwardly toward, and impinge against, the face of the burner tip. This occurs especially in the neighborhood where the metal is in the critical condition of fusion. Stoppage of jets by the flying particles is detrimental to the welding operation, as is well known. The methods involved in this invention produce a flow of gas in such direction as to counteract to a great degree the forces creating the flying particles and also tends to deviate any such flying particles from flight toward the burner face.

Other objects of this invention will be apparent from the description herein, and from the drawing herewith, which form a part hereof, or will be specifically indicated herein.

The invention is not intended to be restricted to the specific construction and arrangement of parts herein shown and described, nor to the specific methods of operation, as the same may be modified in various particulars or be applied in many varied relations without departing from the spirit and scope of the invention, practical embodiments of which have been herein illustrated and described without attempting to show all the various forms and modifications in which the invention might be embodied.

In the accompanying drawing, in which is disclosed apparatus embodying and capable of effecting a method involving the invention:

Fig. 1 is an end elevational view of a welding burner tip which has been modified to embody the invention, portions being shown in section to make apparent certain details of construction;

Fig. 2 is an end elevational view, similar to Fig. 1, illustrating a modified form of application of the invention, portions being shown in section to disclose elements of the construction of the apparatus; and Fig. 3 is a view on a smaller scale of the assembly of Fig. 2, as seen from the plane of the line 3—3.

In Fig. 1 of the drawing there has been shown as apparatus embodying the invention in one of its aspects, a torch tip 10 conforming closely with a construction such as that shown in my Patent No. 1,516,486, dated November 25, 1925. It is, however, to be understood that the invention may be applied to any burner tip of the type used in welding operations wherein the production of hot gases is a part of the process.

In a broad phase of its application, the invention lends itself also to use in conjunction with gas-sheathed arc welding apparatus, and especially where the gas so used is hydrogen or some similar highly combustible gas. In such case, by changes which would be within the scope of the ordinary mechanic, the portions embodying the invention may easily be modified and the results set forth attained.

The invention is specifically shown as applicable to the progressive welding of seams formed by bringing substantially into edge to edge abutting relation sheet or plate members, or by bending sheet or plate metal into tubular or helical form so that a seam, extending either in a straight line or helically and longitudinally of the pipe or tube member is thus formed. In such processes, relative motion of the seam edges past the burner tip, or the burner tip along the seam edges, is effected.

In burners such as shown at 10, a plurality of jets 12 are directed from an orifice face 14 against the surface 16 of the seam margins 18 and 20, the edges 22 and 24 of which are positioned substantially in abutment to form seam 26. The orifices for the jets are spaced longitudinally of the face to form one or more files of jets, which may be arranged to impinge upon margin metal, closely adjacent the edges, in the manner set forth in said patent. In the neighborhood at which it is desired that fusion of the metal occur, as at 28, the spacing of the jets may be decreased to assure a proper heat concentration for fusing the metal of the seam edges until proper commingling results.

To produce the flame jets 12, a mixture of oxygen, preferably in a highly purified condition, and a fuel gas, such as acetylene, is fed to the orifices and there ignited. It has been found in the past that, due to insufficient oxygen supplied with the fuel gas to the jets and the lack of atmospheric oxygen brought into association with the combustible, but non-combustion supporting, gases around the tip, some, or even, all, of the flame jets may be extinguished, in the latter case, with consequent cessation of the welding operation, a condition which is undesirable, due to defects, such as lack of penetration, arising from sudden changes of temperature, and for like reasons.

For the purpose of eliminating such possibilities and also to effect other results herein set forth, the construction of the tip 10 has been modified, as shown, by associating with the body 30 a pair of longitudinally extending deflectors 32, which are attached to or formed with the sides of the body 30 in any desired manner. The portions of the deflectors and of the burner tip body which are in contact at 34 close the tops of the passages 38 formed at the sides of the tip body between the spaced and preferably divergent faces 35 and 36 of the deflectors and the body. Conduits 40 are formed in the deflectors and open toward faces 36 and into passages 38 at intervals. By means of such conduits, air or similar oxidizing gas forced into the conduits from some external source, as through the supply ducts 42, will be passed down along faces 36 and brought directly into contact with the hydrogen envelope gases formed at jets 12. The bottom face 44 of each of the deflectors is formed as a substantially continuous surface having a downward slope away from face 35 and toward the surface 16 of the work. Gases coming through passages 38 and uniting with the burning envelope gases adjacent orifice face 14 will be compelled to flow close to the surface 16 of the work, thus causing the gases to give up a portion of their heat to the metal in close adjacency to the welding region, and to continue to give up heat to the metal as they flow laterally over the surface of the work away from the seam. In addition to the preheating action arising from the application of such heat adjacent the seam region, there is the benefit of a wall of hot metal built up for a considerable distance away from the seam edges and acting to reduce the temperature difference between the region of fusion and the neighboring and more outlying solid metal. In ordinary practice the sharp temperature gradient away from the seam being welded robs the seam edges of much heat put into them by the jets 12, the envelope gases contributing but little heat to oppose this loss by conduction through the metal. In the present invention the envelope gases are so confined and directed that they give direct aid to the jets and further aid by establishing a broad hot zone in the metal.

Since the faces 35 and 44 of the deflectors 32 are subjected to the action of the burning hydrogen envelope gases, means for cooling the deflector bodies is necessary and is provided for by forming these bodies with passages 46 through which water, or a similar cooling fluid, is circulated.

In Fig. 2 a modified construction is illustrated;

in this construction, however, the deflectors 48 are formed and are assembled at 54 on the body 50 of the torch tip 52 in such manner that a plurality of entrances 58 from the surrounding atmosphere open into the tops of the passages between the deflectors and the sides of the burner tip, these passages extending downward to the level of the orifice face 60 from which the high temperature jets 70 are delivered. As in the other form, these passages turn outward in communication with the lateral passages formed between the face of the work metal and the bottom faces 68 of the deflectors, these bottom faces converging toward the surface of the work.

Through the deflectors 48 are formed passages 62, which are connected to supply ducts 64 leading from a source of air under pressure. Through these conduits air, or any other suitable oxidizing gas, is driven and is delivered through one or more mouths 66 at the under and outer lateral portions of the deflectors. The bottom face 68 of each deflector, and the face thereof opposed to the side face 56 of the tip body, confine and deflect the gases as in Fig. 1, with the difference that the flow of the envelope gases and of air entrained through the entrances 58 is an induced flow and that air is introduced to the combustible envelope gases in two stages. Water cooling passages 76 in the deflectors are connected with conduits 77 through which water is led to and from the cooling passages.

In both forms of the invention the heat of the burning envelope gases is confined closely to the surface of the work metal by the manner in which the flow is directed by the deflectors, and the area of heating by these gases is fairly wide. In the form illustrated in Fig. 2 the useful heat surrendered by the envelope gases is extended over the surface of the work to a somewhat greater distance than in the form of Fig. 1.

It is possible also to direct the orifices in such manner that movement of the burning gases will be in the direction in which the jets are moving relatively to the surface of the seam margins, and thus to force the envelope gases to move and burn adjacent the work metal in advance of the welding jets. In this manner, direct preheating of the metal in advance of the action thereon of the welding jets is accomplished.

In the spaces or passages formed between the deflectors, the tip body, and the work metal, there is a commingling of the envelope gases with air accompanied by combustion in the mixture, but the commingling in these regions is not complete and the relations are such that a bottom stratum of envelope gases constantly sweeps in contact with the highly heated metal and by its reducing action protects the metal from oxidation. As the air and the envelope gases proceed farther from the seam and from the high temperature jets from which the envelope gases are released, and when they are eventually discharged beyond the deflectors, still flowing substantially parallel with the surface of the work, the commingling and burning of the gases with air continue until as much as possible of the heat of the gases has been put into the metal.

The direction given to the envelope gases, augmented by air, so that a flow is produced away from the jets and substantially parallel with the surface of the work, minimizes the possibility of particles of slag striking back into the jet orifices and obstructing them.

Many other changes could be effected in the particular apparatus designed, and in the methods of operation set forth, and in the specific details thereof herein involved without substantially departing from the invention which is intended to be defined in the accompanying claims.

I claim:

1. Apparatus for welding metal, which includes: a torch having a face perforated to deliver a seamwise extending system of flame, means for controlling the flow and combustion of the envelope gases of the flame system, including parts associated with said torch to provide passages for the admission of air to join said envelope gases, additional passages for supplying forced streams of oxidizing gas, said additional passages being located and directed so as to cause an induced flow of the envelope gases and oxidizing gas along the surface of the metal and away from the region of fusion, and means for circulating a cooling medium in said parts.

2. Apparatus for welding metal, which includes: a torch having a perforate face from which is delivered a seamwise extending system of flame, and parts secured to said torch and having passages directed to discharge independent jets of an oxidizing gas downwardly upon and along the surface being heated and away from said torch to cause an induced flow of envelope gases of the flame system, said parts forming with said torch passages for guiding an oxidizing gas to said envelope gases, and said parts being located in position to restrain and guide the gases along the surface of the metal to be heated during their combustion reaction.

3. Apparatus for welding metal, which includes: a torch adapted to deliver a seamwise extending system of flame, and means for furthering the combustion of envelope gases of the flame system, including parts secured to said torch and having passages for independent jets of gas located and directed to cause an induced flow of the envelope gases and an oxidizing gas, said parts forming with said torch passages for guiding oxidizing gas to said envelope gases, and said parts being located in position to restrain gases during their reaction to movement along the surface of the metal to be heated.

4. Oxyacetylene welding apparatus comprising a torch having a perforate face burner adapted to deliver a seamwise-extending system of flame, and deflectors extending transversely from both sides of the torch burner and connected with the torch in such positions that said deflectors are close to the surface of the work and confine the flame envelope gases so that said gases flow outwardly along the surface of the metal on both sides of the seam during a welding operation.

5. Oxyacetylene welding apparatus comprising a torch having a perforate face burner adapted to deliver a seamwise-extending system of flame, and deflectors extending transversely from both sides of the torch burner and connected with the torch in such positions that said deflectors are close to the surface of the work and confine the flame envelope gases so that said gases flow outwardly along the surface of the metal on both sides of the seam during a welding operation, the deflectors being spaced from the torch burner to provide lengthwise extending passages through which atmospheric air can be drawn for combustion of the envelope gases.

6. Welding apparatus comprising a torch having a perforate face burner from which a system of flame is directed against the work longitudinally along an edge to be welded, and members located on both sides of the torch burner with spaces between the burner and said members, said spaces comprising passages for the admission of air throughout the length of the flame system to the envelope gases of said flame system, said members extending laterally of the torch in positions to confine the burning envelope gases and cause them to flow laterally across the surface of the work.

7. Apparatus for welding metal, which includes: a torch having an elongated perforate face for delivering a system of flame extending lengthwise of the edge to be welded, and means for furthering the combustion of envelope gases of the flame system, including parts associated with said torch having means for producing an induced flow of envelope gases and oxidizing gas in a different direction from the lengthwise extent of the edge to be welded, and located in position to restrain the gases during their reaction to movement across the surface of the metal.

8. Apparatus for welding metal, which includes: a torch having an elongated perforate face for delivering a system of flame extending lengthwise of the edge to be welded, means for furthering the combustion of envelope gases of the flame system, including portions associated with said torch and forming passages for guiding an oxidizing gas to said envelope gases intermediate the ends of the flame system, and for restraining the gases during their reaction to movement along the surface of the metal and away from the heated edge, and means in said portions for preventing overheating thereof.

9. Apparatus for welding metal, which includes: a torch having an elongated perforate face for delivering a system of flame extending longitudinally along an edge to be welded, and means for furthering the combustion of envelope gases of the flame system, including parts associated with said torch and located in positions with respect to the torch and the work to form passages for guiding an oxidizing gas to said envelope gases intermediate the ends of the flame system, and for guiding a stratum of the protective envelope gases over the surface of the metal away from said edge, so that the gases progressively commingle and burn as they proceed away from the torch and in close proximity to the work metal.

10. Apparatus for welding metal, which includes; a torch having an elongated perforate face for delivering a system of flame extending longitudinally along an edge to be welded, and means for controlling the flow and combustion of envelope gases produced by said system of flame, including parts associated with said torch and providing passages for guiding an oxidizing gas to said envelope gases intermediate the ends of the flame system, and for restraining the gases during their reaction to cause the combustion to take place close to the surface of the metal to be heated.

11. Apparatus for welding metal, which includes: a torch having an elongated perforate face for delivering a seamwise extending system of flame, and parts providing passages for delivering an oxidizing gas to the envelope gases of the flame system adjacent the region of issuance and throughout the length of said system of flame, and deflector faces for restraining the gases during their reaction to movement along the surface of the metal to be heated.

12. Apparatus for welding metal, which includes: a torch having an elongated perforate face for delivering a seamwise extending system of flame, and means for controlling the flow and combustion of envelope gases of the flame system, including parts secured to opposite sides of said torch and forming therewith elongated passages extending lengthwise along the sides of said torch for guiding an oxidizing gas to said envelope gases along the length of the flame system, and means for restraining the gases during their reaction to movement away from the seam and across the surface of the metal on both sides of said flame system.

13. Apparatus for welding metal, which includes: an oxyacetylene torch having an elongated perforate face for delivering a system of flame extending longitudinally along an edge to be welded, means for controlling the flow and combustion of the envelope gases of the flame system, including means to supply an oxidizing gas to said envelope gases throughout the length of the flame system, and means for restraining the gases close to the surface of the metal to be heated during their combustion reaction.

14. Apparatus for welding metal, which includes: an oxyacetylene torch having an elongated perforate face for projecting a system of flame extending longitudinally along an edge to be welded, and means for controlling the flow and combustion of the envelope gases of the flame system, including means for guiding an oxidizing gas into contact with the envelope gases throughout the length of the flame system, and means for restraining the gases to movement away from said edge and across the surface of the metal in such manner that the hot metal is covered by a stratum of hot envelope gases.

15. Apparatus for welding metal, which comprises: an oxyacetylene torch for directing a high-temperature edgewise-extending system of flame against the metal to create fusion temperatures in metal along an edge to be welded, and deflectors in positions to cause the envelope gases formed in proximity to the fusing metal to move across the surface of the metal laterally of the edge and heat the metal back from the heated edge to reduce conduction losses from the metal against which the system of flame is being directed.

16. Apparatus for welding metal, which comprises: torch means for creating fusion temperatures in such metal during relative movement of the metal and torch means, and a deflector extending laterally of the direction of relative movement and close to the surface of the metal in position for causing hot gases from the region of the weld to be mixed with air and to be confined close to the metal as they flow away from the fusing metal and across the surface of the unmolten metal laterally of the direction of relative movement of the metal and torch means.

17. Metal welding apparatus comprising an oxyacetylene torch having an elongated perforate burner for projecting a seamwise-extended system of flame toward the metal, and deflectors on both sides of the torch burner, said deflectors having faces spaced from and overlying the surface of the metal on both sides of the seam in positions to confine and guide the flame envelope gases laterally across the surface of the metal on both sides of the seam.

JAMES L. ANDERSON.